(12) United States Patent
Byxbe et al.

(10) Patent No.: US 12,026,603 B2
(45) Date of Patent: Jul. 2, 2024

(54) VISUALIZATION OF PREDICTIVE HEALTH MONITORING

(71) Applicant: Rockwell Collins, Inc., Cedar Rapids, IA (US)

(72) Inventors: Valerie R. Byxbe, Cedar Rapids, IA (US); Angela N. Dunlay, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 379 days.

(21) Appl. No.: 17/392,009

(22) Filed: Aug. 2, 2021

(65) Prior Publication Data

US 2023/0030010 A1 Feb. 2, 2023

(51) Int. Cl.
*G06N 3/04* (2023.01)
*G08G 5/00* (2006.01)
*B64D 45/00* (2006.01)

(52) U.S. Cl.
CPC .............. *G06N 3/04* (2013.01); *G08G 5/0021* (2013.01); *G08G 5/0091* (2013.01); *B64D 2045/0085* (2013.01)

(58) Field of Classification Search
CPC ........................ B64D 45/00; B64D 2045/0085; G01C 23/00; G08G 5/0021; G08G 5/0091; G08G 5/0052; G06N 3/04; G06N 20/00; G06N 3/08; G06N 3/045; G06F 11/079; G06F 11/0793; G06F 9/3844; G06F 11/0751; H04L 41/147; H04L 67/535; G06Q 10/0635; G06Q 10/063
See application file for complete search history.

(56) References Cited

U.S. PATENT DOCUMENTS

| | | | |
|---|---|---|---|
| 9,494,945 B2 | 11/2016 | Coulmeau et al. | |
| 10,121,384 B2 | 11/2018 | Hale | |
| 10,672,279 B2 | 6/2020 | Shamasundar et al. | |
| 10,964,130 B1* | 3/2021 | Dixit | G05B 23/0283 |
| 11,393,348 B1* | 7/2022 | Chartier | G08G 5/0008 |
| 2018/0268722 A1 | 9/2018 | Meier et al. | |
| 2020/0168103 A1 | 5/2020 | Holder et al. | |
| 2022/0017232 A1* | 1/2022 | Bilek | G01W 1/10 |
| 2022/0245526 A1* | 8/2022 | Banubakode | G06N 7/01 |

FOREIGN PATENT DOCUMENTS

EP 3660461 A1 6/2020

* cited by examiner

*Primary Examiner* — Xilin Guo
(74) *Attorney, Agent, or Firm* — Suiter Swantz IP

(57) ABSTRACT

A system for incorporating predictive health data into a mission timeline receives a predictive health event, identifies a time frame for the event, and incorporates the event into a mission timeline. The event may define a probability window with weighted probabilities overlaid onto the mission timeline. The event may define an uncorrected outcome. The uncorrected outcome is rendered onto the mission timeline at a point when the uncorrected outcome will likely occur if no remedial action is taken.

17 Claims, 4 Drawing Sheets

VISUALIZATION OF PREDICTIVE HEALTH MONITORING

BACKGROUND

Predictive health monitoring systems observe and flag events that could or will impact a pilot's ability to complete a mission. However, there are no useful mechanisms for delivering that information to the pilot in a meaningful way that increases the pilot's awareness of the situation.

SUMMARY

In one aspect, embodiments of the inventive concepts disclosed herein are directed to a system for incorporating predictive health data into a mission timeline. The system receives a predictive health event, identifies a time frame for the event, and incorporates the event into a mission timeline.

In a further aspect, the event may define a probability window with weighted probabilities overlaid onto the mission timeline.

In a further aspect, the event may define an uncorrected outcome. The uncorrected outcome is rendered onto the mission timeline at a point when the uncorrected outcome will likely occur if no remedial action is taken.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
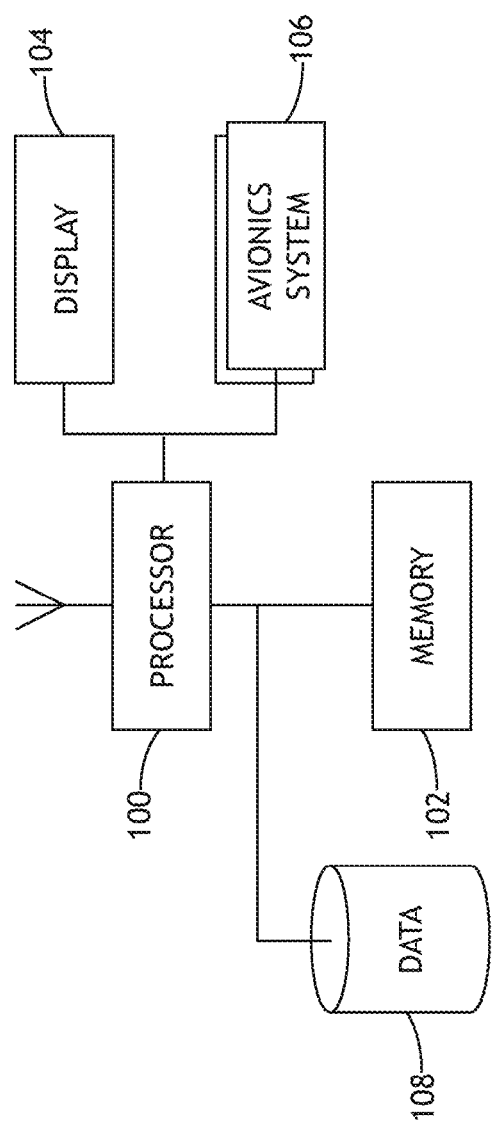
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for incorporating predictive health data into a mission timeline. The system receives a predictive health event, identifies a time frame for the event, and incorporates the event into a mission timeline.

Referring to FIG. 1, a block diagram of a system for implementing an exemplary embodiment is shown. The system includes a processor 100, memory 102 connected to the processor 100, and a display 104 for rendering an action window and mission timeline. The processor 100 receives one or more predicted events; each predicted event defines an event type and some indication of the predicted time of occurrence. For example, a separate avionics system 106 monitoring fuel usage may determine that, based on current or average consumption rates, an aircraft will run out of fuel at a predetermined time in the future. That event, including the type ("fuel exhaustion") and time, and transmitted to the processor 100.

The processor 100 maintains an action window on the display including a rendered mission timeline including various markers of relevant mission events. The processor 100 identifies where on the mission timeline the predicted event occurs and incorporates some event symbology into the mission timeline corresponding to the event type at the identified time relative to the overall mission. In at least one embodiment, the processor 100 may re-render existing mission events so as to avoid obfuscating the predicted event symbology and vice-versa.

In at least one embodiment, the predicted events may define a weighted probability of occurrence over time. In those cases, the processor 100 may render the predicted event over a window of probability. The window of probability may include an artifice to indicate the distribution of probability; for example, the window of probability may be shaded with the most shaded portion in the temporal region of highest probability, and reduced shading accordingly. Alternatively, varying colors may be utilized for different probabilities. Alternatively, a probability curve may be rendered in the window of probability.

In at least one embodiment, the predicted events may define a degradation curve corresponding to a window of time wherein the predicted event is likely to begin and progressively degrade over time.

In at least one embodiment, the predicted events may include an indication of an uncorrected outcome; that is to say, an indication of the anticipated result if the predicted event is not addressed. The indication of uncorrected outcome may define a separate time indication corresponding to when the uncorrected outcome will occur. For example, where the predicted event indicates fuel exhaustion, the uncorrected outcome may indicate engine failure and crash rendered on the mission timeline shortly afterwards. Alternatively, where the predicted event indicates a mission critical system failure, the uncorrected outcome may indicate a time after the mission critical system failure when the mission will have to be aborted.

In at least one embodiment, avionics systems 106 may update predicted events from time to time. In at least one embodiment, the predicted events may be based on statistical analysis of various factors including factors internal to the aircraft and factors external to the aircraft. As factors are updated, the predicted events may also be updated. In at least one embodiment, predicted events may be based on a Bayesian probability analysis.

Figure 2:
FIG. 2 shows an action window with a rendered mission timeline.

Referring to FIG. 2, an action window with a rendered mission timeline 200 is shown. In a unified action window display where multiple information sources are combined into a single rendered display, the mission timeline 200 may include indications of mission critical events over time (as distinct from other information sources which may be defined by points in space).

Figure 3:
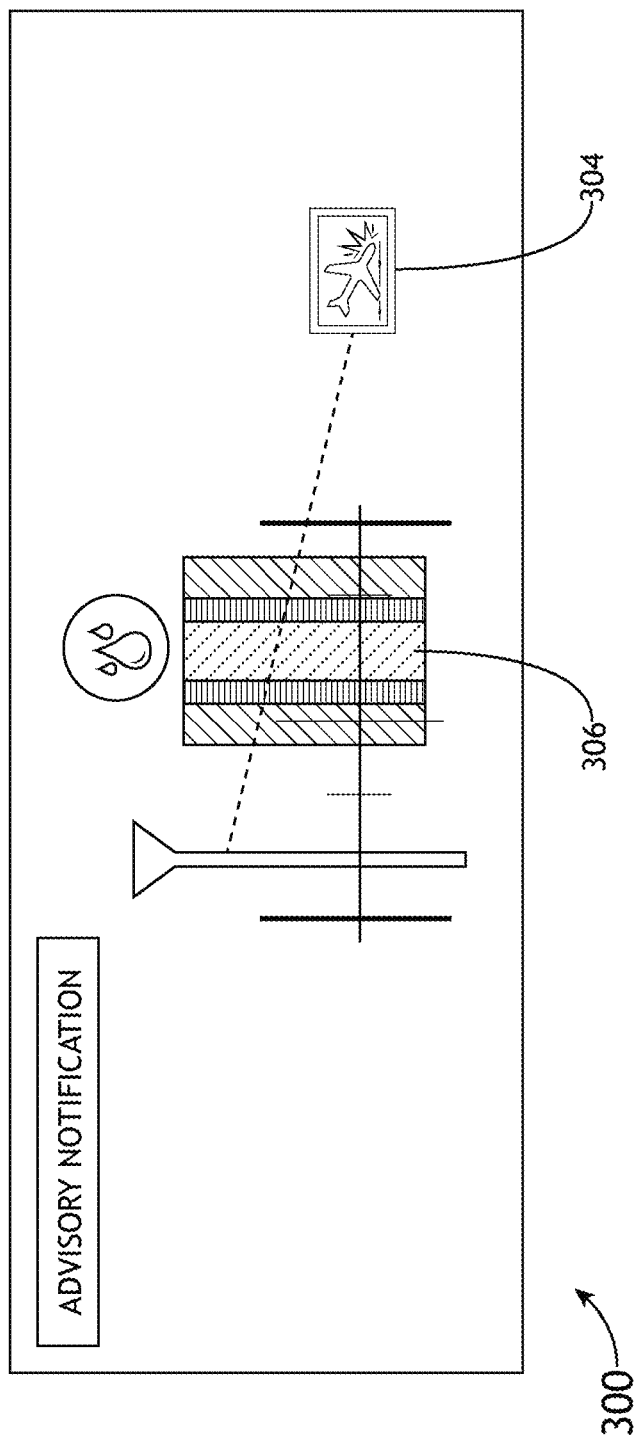
FIG. 3 shows a rendered mission timeline including an exemplary embodiment.

Referring to FIG. 3, a rendered mission timeline 300 including an exemplary embodiment is shown. The mission timeline 300 includes a symbol 302 corresponding an event type defined by a predicted event and a temporal indication 306 corresponding to a predicted time of the event. In at least one embodiment, the temporal indication 306 may comprise a window of probability with shaded regions corresponding to greater or lesser predicted probabilities of the event occurring at that time. Such window of probability may be defined by statistical analysis of similar events, either mathematically or via a machine learning algorithm.

In at least one embodiment, the predicted event may include an uncorrected outcome corresponding to a result if the event is not addressed. The uncorrected outcome may also be translated to an outcome symbol 304 and rendered at an indicated time on the mission timeline 300.

Figure 4:
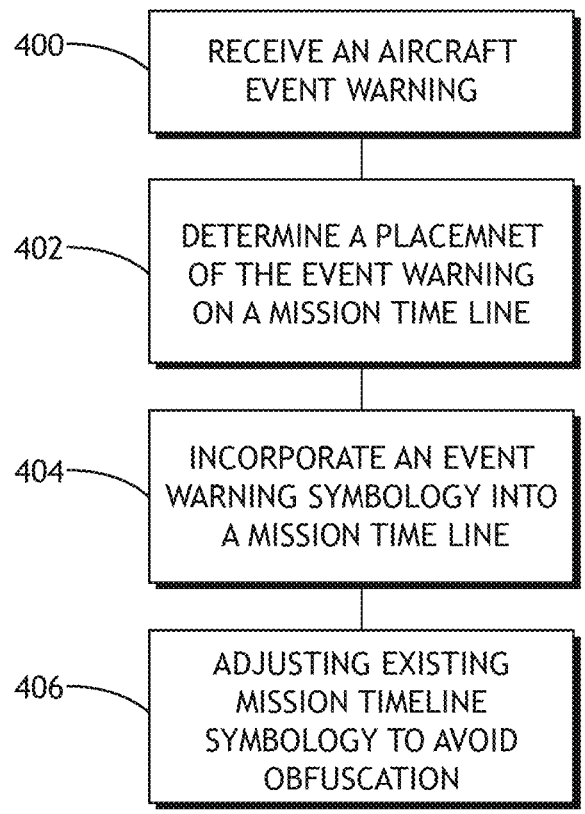
FIG. 4 shows a flowchart of a method for incorporating predictive health events into a mission timeline according to an exemplary embodiment.

Referring to FIG. 4, a flowchart of a method for incorporating predictive health events into a mission timeline according to an exemplary embodiment is shown. The system implementing the method receives 400 a predicted event warning comprising an event type and a predicted time of occurrence. In at least one embodiment, the predicted time of occurrence may comprise a weighted, probabilistic window of occurrence. Alternatively, or in addition, the time of occurrence may comprise a degradation curve indicating a prediction of how the event may degrade over a period of time.

The system determines 402 a placement of the event warning within a mission time line, and incorporates 404 the event warning into the timeline by identifying a symbol corresponding to the event type, and placing that symbology on the mission timeline at the determined placement. Where the predicted event time corresponds to a weighted, probabilistic window or degradation curve, a window representing the weighted distribution or degradation curve is rendered at the appropriate mission timeline location.

In at least one embodiment, the location and/or time window may be periodically updated according to updated event details from a corresponding avionics system. Furthermore, surrounding symbology, such as mission event markers, may be adjusted 406 to accommodate the predicted event warning symbols.

In at least one embodiment, the predicted event warning symbology may comprise symbols corresponding to a predicted, uncorrected outcome, indicating a type and time of outcome that will occur if the predicted event is unaddressed.

In at least one embodiment, the predicted events may be based on current aircraft and environmental conditions, pilot entered information, stored statistical data, etc. Such data may be used by a trained neural network to produce the event type and predicted time of the predicted event warnings.

The visualization is a depiction of critical events that are predicted to impact mission success overlaid on a mission timeline. The predicted system degradation is visualized relative to a current state of the mission and aircraft, as well as the predicted events. It shows when a predicted event is likely to occur, and gives the user a certainty range, using opacity to communicate increasing or decreasing probability of occurrence. It also shows the user the predicted result if corrective action is not taken, in the form of an icon at the end of the degradation trend line.

A visualization system overlaid on the mission timeline gives a pilot an immediate understanding of when the flagged event would potentially impact the mission, and increase awareness by providing timely alerting. This information overlay will allow the pilot to predict future system status, increase the pilot's overall situation awareness in time-critical scenarios, and address the need for more advanced system monitoring technology in the flight deck.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
a display; and
at least one processor in data communication with the display and a memory storing processor executable code for configuring the at least one processor to:
receive one or more predicted events, each of the one or more predicted events comprising an event type, a predicted time of the event, and an uncorrected outcome;
determine a location on a rendered mission timeline corresponding to the predicted time of each of the one or more predicted events;
determine a first symbol for each predicted event based on the event type;
determine a second symbol corresponding to the uncorrected outcome;
render the first symbols at the determined location; and
render the second symbol corresponding to the uncorrected outcome,
wherein at least one predicted event corresponds to a mission critical component failure and the corresponding uncorrected outcome comprises a mission abort time.

2. The computer apparatus of claim 1, wherein the predicted time comprises a weighted probability window of occurrence.

3. The computer apparatus of claim 2, wherein the at least one processor is further configured to render the weighted probability window as variably shaded region defined by probabilities of the predicted time.

4. The computer apparatus of claim 1, wherein:
the predicted time comprises a degradation curve; and
the at least one processor is further configured to render the degradation curve across a corresponding window of occurrence.

5. The computer apparatus of claim 1, wherein the at least one processor is further configured to:
periodically receive updates to the one or more predicted events; and
update corresponding symbology on the mission timeline.

6. The computer apparatus of claim 1, wherein the one or more predicted events are determined via a Bayesian analysis of aircraft conditions and environmental conditions.

7. A method comprising:
receiving one or more predicted events, each of the one or more predicted events comprising an event type, a predicted time of the event, and an uncorrected outcome;
determining a location on a rendered mission timeline corresponding to the predicted time of each of the one or more predicted events;
determining a first symbol for each predicted event based on the event type;
determining a second symbol corresponding to the uncorrected outcome;
render the first symbols at the determined location on the mission timeline; and
rendering the second symbol corresponding to the uncorrected outcome,
wherein at least one predicted event corresponds to a mission critical component failure and the corresponding uncorrected outcome comprises a mission abort time.

8. The method of claim 7, wherein:
the predicted time comprises a weighted probability window of occurrence; and
further comprising rendering the weighted probability window as variably shaded region defined by probabilities of the predicted time.

9. The method of claim 7, wherein:
the predicted time comprises a degradation curve; and
further comprising rendering the degradation curve across a corresponding window of occurrence.

10. The method of claim 7, further comprising:
periodically receiving updates to the one or more predicted events; and
updating corresponding symbology on the mission timeline.

11. The method of claim 7, wherein the one or more predicted events are determined via a Bayesian analysis of aircraft conditions and environmental conditions.

12. A pilot awareness system comprising:
a display; and
at least one processor in data communication with the display and a memory storing processor executable code for configuring the at least one processor to:
receive one or more predicted events, each of the one or more predicted events comprising an event type, a predicted time of the event, and an uncorrected outcome;
determine a location on a rendered mission timeline corresponding to the predicted time of each of the one or more predicted events;
determine a first symbol for each predicted event based on the event type;
determine a second symbol corresponding to the uncorrected outcome;
render the first symbols at the determined location; and
render the second symbol corresponding to the uncorrected outcome,
wherein at least one predicted event corresponds to a mission critical component failure and the corresponding uncorrected outcome comprises a mission abort time.

13. The pilot awareness system of claim 12, wherein the predicted time comprises a weighted probability window of occurrence.

14. The pilot awareness system of claim 13, wherein the at least one processor is further configured to render the weighted probability window as variably shaded region defined by probabilities of the predicted time.

15. The pilot awareness system of claim 12, wherein:
the predicted time comprises a degradation curve; and
the at least one processor is further configured to render the degradation curve across a corresponding window of occurrence.

16. The pilot awareness system of claim 12, wherein the at least one processor is further configured to:
periodically receive updates to the one or more predicted events; and
update corresponding symbology on the mission timeline.

17. The pilot awareness system of claim 12, wherein the one or more predicted events are determined via a neural network configured to receive aircraft conditions and environmental conditions.

* * * * *